E. H. BUCKLEY.
SPRING LUBRICATING DEVICE.
APPLICATION FILED SEPT. 21, 1920. RENEWED NOV. 19, 1921.
1,413,963.  
Patented Apr. 25, 1922.
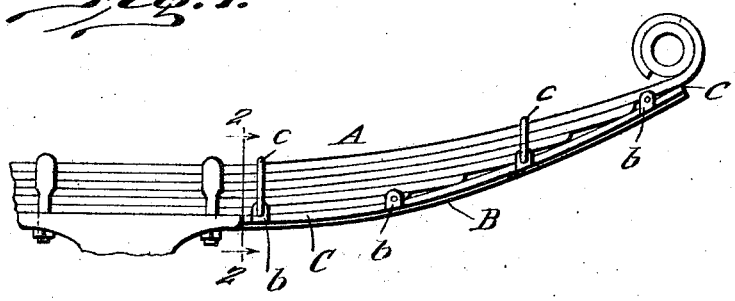
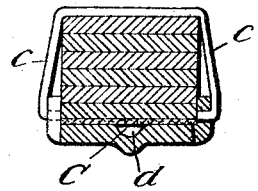
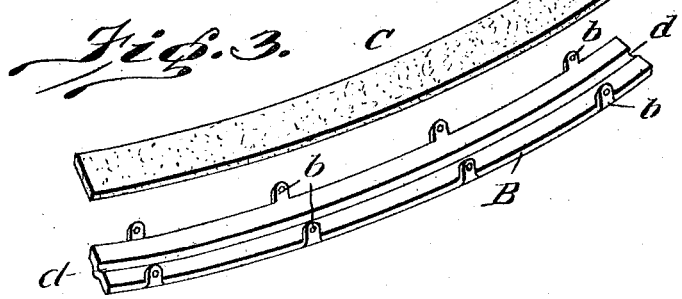
E. H. Buckley, INVENTOR.
Witness  
BY Geo. F. Kimmel, ATTORNEY.

UNITED STATES PATENT OFFICE.

EDWARD H. BUCKLEY, OF PHILADELPHIA, PENNSYLVANIA.

SPRING-LUBRICATING DEVICE.

1,413,963.  Specification of Letters Patent.  Patented Apr. 25, 1922.

Application filed September 21, 1920, Serial No. 411,703. Renewed November 19, 1921. Serial No. 516,513.

*To all whom it may concern:*

Be it known that I, EDWARD H. BUCKLEY, a citizen of the United States, residing at Philadelphia, in the county of Philadelphia and State of Pennsylvania, have invented certain new and useful Improvements in Spring-Lubricating Devices, of which the following is a specification.

My invention relates to means for lubricating leaf springs, and comprises a grooved plate to be applied to the spring to convey oil to all parts thereof.

In the accompanying drawing, which illustrates my invention:

Figure 1 is a broken side view of a multiplex spring having my invention applied thereto.

Figure 2 is a transverse section on the line 2—2, and

Figure 3 a perspective view of a strip of felt and a longitudinally grooved metal plate to clamp the strip of felt against the flat side of the spring.

The spring A, shown in the drawing resembles the ordinary motor spring made up of a plurality of curved spring plates laid together and securely fastened together at mid length. Such springs are too common and too well known to require further detailed description in this connection. B designates a strip of sheet metal of length and width corresponding to the length and width of the spring to which it is to be applied, and it has formed at both edges lugs *b* which are perforated and bent up at right angles. These lugs receive the inturned ends of stirrups *c* applied as shown in Figs. 1 and 2 to hold the strip B in place when applied to the spring.

On the inner side of the strip B is a groove or channel *d* which extends from end to end, and which is conveniently formed by stamping or by passing the strip between rolls with rib and groove to press the strip.

The felt or porous strip C is conveniently applied by laying it upon the inner side of strip B, then applying the two strips to the spring and securing them in place by applying the stirrups *c*.

Oil is introduced into the groove or channel *d* until the overlying porous strip becomes saturated. Oil will then be applied by the strip to the overlapping ends of the spring plates, and by the sliding movement of said plates on each other, resulting from flexure of the spring in use, the oil will move inward between the spring plates and lubricate them throughout.

Having thus described my invention, I claim:

1. An oiler for superimposed, overlapping ply springs comprising a plate disposed beneath the springs and having side attaching elements and a longitudinally extending groove constituting a conduit for a lubricant, a porous strip overlying said groove and confined between the attaching elements, and means connecting said attaching elements for securing the plate to the springs.

2. An oiler for attachment to the ends of superimposed, overlapping ply springs comprising a curved, plate disposed beneath the springs and having upstanding side attaching elements and an intermediate, longitudinally extending groove constituting a conduit or a lubricant, a flat porous strip overlying said groove beneath the springs and retained between the attaching elements and separable means connecting said attaching elements for securing the plate to the springs.

3. An oiler for attachment to a plurality of superimposed overlapping ply springs comprising a curved, plate disposed beneath the springs and having apertured attaching ears on opposite sides thereof and a longitudinally extending groove therein constituting an oil passage, a porous strip overlying said groove between the attaching ears and stirrups connecting said attaching ears for securing the plate to the springs.

4. An oiler attachment of the class described comprising a grooved plate adapted to be disposed beneath and secured to a spring, a porous strip overlying said groove and separably connected elements for securing said plate in position with respect to the bottom of a spring.

In testimony whereof, I affix my signature hereto.

EDWARD H. BUCKLEY.